United States Patent
Newhouse

(12) 
(10) Patent No.: US 10,465,848 B1
(45) Date of Patent: Nov. 5, 2019

(54) CONFORMABLE COMPOSITE PRESSURE VESSEL

(71) Applicant: Hexagon Technology AS, Alesund (NO)

(72) Inventor: Norman L. Newhouse, Lincoln, NE (US)

(73) Assignee: Hexagon Technology AS, Alesund (NO)

( * ) Notice: Subject to any disclaimer, the term of this patent is extended or adjusted under 35 U.S.C. 154(b) by 405 days.

(21) Appl. No.: 15/270,771

(22) Filed: Sep. 20, 2016

Related U.S. Application Data

(60) Provisional application No. 62/221,525, filed on Sep. 21, 2015.

(51) Int. Cl.
*F17C 1/04* (2006.01)
*F17C 1/08* (2006.01)
*F17C 1/16* (2006.01)

(52) U.S. Cl.
CPC .......... *F17C 1/04* (2013.01); *F17C 1/08* (2013.01); *F17C 1/16* (2013.01); *F17C 2201/0109* (2013.01); *F17C 2201/0166* (2013.01); *F17C 2201/0171* (2013.01); *F17C 2203/012* (2013.01); *F17C 2203/0604* (2013.01); *F17C 2203/0643* (2013.01); *F17C 2203/0646* (2013.01); *F17C 2203/0648* (2013.01); *F17C 2205/0134* (2013.01)

(58) Field of Classification Search
CPC .............. F17C 1/04; F17C 2201/0109; F17C 2205/013; F17C 2205/0134; F17C 2205/0142; B60K 15/067
See application file for complete search history.

(56) References Cited

U.S. PATENT DOCUMENTS

| | | | |
|---|---|---|---|
| 4,356,925 A | 11/1982 | Gerhard | |
| 4,459,929 A | 7/1984 | Ffooks | |
| 4,946,056 A | 8/1990 | Stannard | |
| 5,419,139 A * | 5/1995 | Blum | B32B 7/02 62/45.1 |
| 5,577,630 A | 11/1996 | Blair et al. | |
| 5,651,474 A | 7/1997 | Callaghan et al. | |

(Continued)

FOREIGN PATENT DOCUMENTS

DE 102012223676 A1 3/2014

*Primary Examiner* — Andrew T Kirsch
(74) *Attorney, Agent, or Firm* — Mai-Tram D. Lauer; Westman, Champlin & Koehler, P.A.

(57) ABSTRACT

An apparatus comprises a plurality of substantially cylindrical pressure vessel structures. Each cylindrical pressure vessel structure has first and second opposite ends. A first cap is positioned at the first ends of the plurality of cylindrical pressure vessel structures. The first cap includes a first dome-shaped protrusion that corresponds to each of the first ends. A first saddle is defined between adjacent first dome-shaped protrusions. A second cap is positioned at the second ends of the plurality of cylindrical pressure vessel structures. The second cap includes a second dome-shaped protrusion that corresponds to each of the second ends. A second saddle is defined between adjacent second dome-shaped protrusions. A reinforcement structure extends around the first and second caps, and is disposed within one of the first saddles and one of the second saddles.

17 Claims, 10 Drawing Sheets

(56) References Cited

U.S. PATENT DOCUMENTS

| | | | |
|---|---|---|---|
| 6,095,367 | A | 8/2000 | Blair et al. |
| 6,257,360 | B1 * | 7/2001 | Wozniak .............. B60K 15/013 180/69.5 |
| 6,418,962 | B1 | 7/2002 | Wozniak et al. |
| 6,708,719 | B2 | 3/2004 | Idoguchi |
| 6,796,453 | B2 | 9/2004 | Sanders |
| 7,131,553 | B2 | 11/2006 | Sanders |
| 7,159,738 | B2 | 1/2007 | Luongo |
| 7,971,740 | B2 | 7/2011 | Shimada et al. |
| 8,020,722 | B2 | 9/2011 | Richards et al. |
| 8,459,577 | B2 | 6/2013 | Manubolu et al. |
| 8,480,131 | B2 | 7/2013 | Schultheis et al. |
| 8,517,206 | B2 | 8/2013 | Liu |
| 8,561,827 | B2 | 10/2013 | Goggin |
| 8,602,249 | B2 | 12/2013 | Fawley |
| 8,608,202 | B2 | 12/2013 | Dossow |
| 8,672,358 | B2 | 3/2014 | Oelerich et al. |
| 8,689,772 | B2 | 4/2014 | Heller et al. |
| 8,701,925 | B2 | 4/2014 | Kubusch |
| 8,733,382 | B2 | 5/2014 | Suess |
| 8,851,320 | B2 | 10/2014 | Ramoo et al. |
| 8,851,321 | B2 | 10/2014 | Ramoo et al. |
| 8,865,370 | B2 | 10/2014 | Zimmermann et al. |
| 2009/0090726 | A1 | 4/2009 | Kawamata |
| 2010/0258572 | A1 | 10/2010 | Luongo |
| 2013/0048513 | A1 | 2/2013 | Ramoo et al. |
| 2013/0098919 | A1 | 4/2013 | Jarzynski |
| 2013/0146605 | A1 | 6/2013 | Ramoo et al. |
| 2013/0305978 | A1 | 11/2013 | Glezer et al. |

* cited by examiner

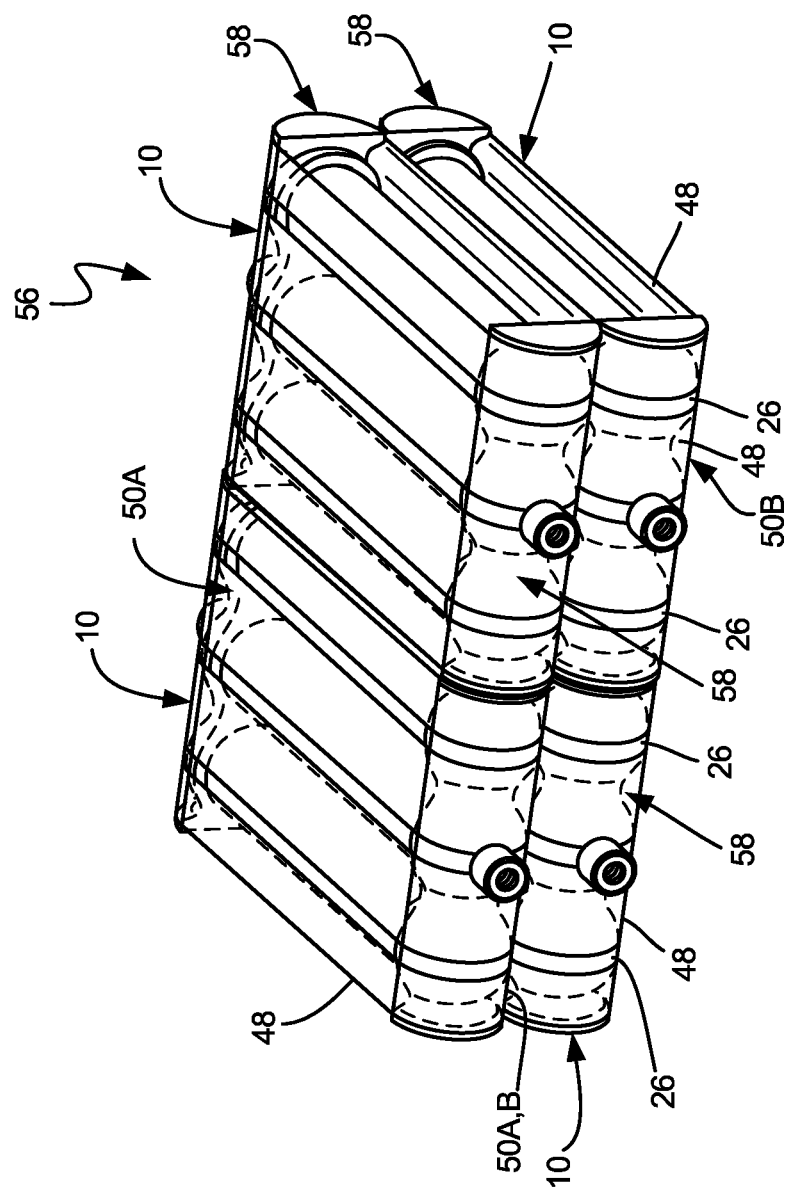

CONFORMABLE COMPOSITE PRESSURE VESSEL

CROSS REFERENCE TO RELATED APPLICATION

This application claims the benefit of priority of U.S. Provisional Patent Application No. 62/221,525, filed Sep. 21, 2015, which is hereby incorporated by reference.

BACKGROUND

Pressure vessels are commonly used for containing a variety of fluids under pressure, such as storing hydrogen, oxygen, natural gas, nitrogen, propane and other fuels, for example. Generally, pressure vessels can have any size or configuration. For example, the vessels can be heavy or light; single-use (e.g., disposable) or reusable; subjectable to high pressures (greater than 50 psi, for example) or low pressures (less than 50 psi, for example); and used for storing fluids at elevated or cryogenic temperatures.

Suitable composite container materials include laminated layers of wound fiberglass filaments or other synthetic filaments bonded together by a thermal-setting or thermoplastic resin. A polymeric or other non-metal resilient liner or bladder often is disposed within a composite shell to seal the vessel and prevent internal fluids from contacting the composite material, thereby serving as a fluid permeation barrier. During manufacture of a pressure vessel, the pressure vessel liner and the dispensing head for the composite fibers move in relation to one another in such a way as to wrap the fiber on the liner in a desired pattern. If the vessel is cylindrical, rather than spherical, fiber winding is normally applied in both a longitudinal (helical) and a circumferential (hoop) wrap. This winding process is defined by a number of factors, such as resin content, fiber configuration, winding tension, and the pattern of the wrap in relation to the axis of the liner.

SUMMARY

In one aspect, an apparatus having a plurality of substantially cylindrical pressure vessel structures is provided. Each cylindrical pressure vessel structure has first and second opposite ends. A first cap is positioned at the first ends of the plurality of cylindrical pressure vessel structures. The first cap includes a first dome-shaped protrusion that corresponds to each of the first ends. A first saddle is defined between adjacent first dome-shaped protrusions. A second cap is positioned at the second ends of the plurality of cylindrical pressure vessel structures. The second cap includes a second dome-shaped protrusion that corresponds to each of the second ends. A second saddle is defined between adjacent second dome-shaped protrusions. A reinforcement structure extends around the first and second caps, and is disposed within the one of the first saddles and one of the second saddles.

In another aspect, a method of constructing an assembly of a plurality of composite pressure vessels is disclosed. The method comprises forming a plurality of generally cylindrical pressure vessel structures, where each pressure vessel structure has a first end and a second end. The method further comprises inserting the first end of the plurality of pressure vessel structures into a first cap, and inserting the second end of the plurality of pressure vessel structures into a second cap. The method also includes winding a reinforcement structure around the first and second caps.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, or relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

FIG. 10 a perspective view of a stacked configuration including a plurality of pressure vessel assemblies.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION OF ILLUSTRATIVE EMBODIMENTS

The present disclosure relates to an assembly of composite pressure vessel structures arranged in a compact configuration that is conformable to different environments based upon space available to contain the vessels. A cylindrical configuration for a pressure vessel is most suitable for handling the high pressures of compressed gases; however, cylinders do not stack easily because of their rounded shapes surrounded by void spaces. In an exemplary conformable composite assembly of the present disclosure, reinforcement structures, such as fibers, are used to fill the void space, thus efficiently using the available space to strengthen the pressure vessel structures. The reinforcement fibers are disposed in between each cylindrical configuration of pressure vessel structures such that each assembly takes the form of a rectangular prism, which is easy to stack and makes efficient use of the available space. The composite pressure vessel structures can be stacked as high, wide and deep as desired to suit the available space. Moreover, the number of pressure vessel structures that can be stacked in a particular arrangement depends on the available space.

Figure 1:
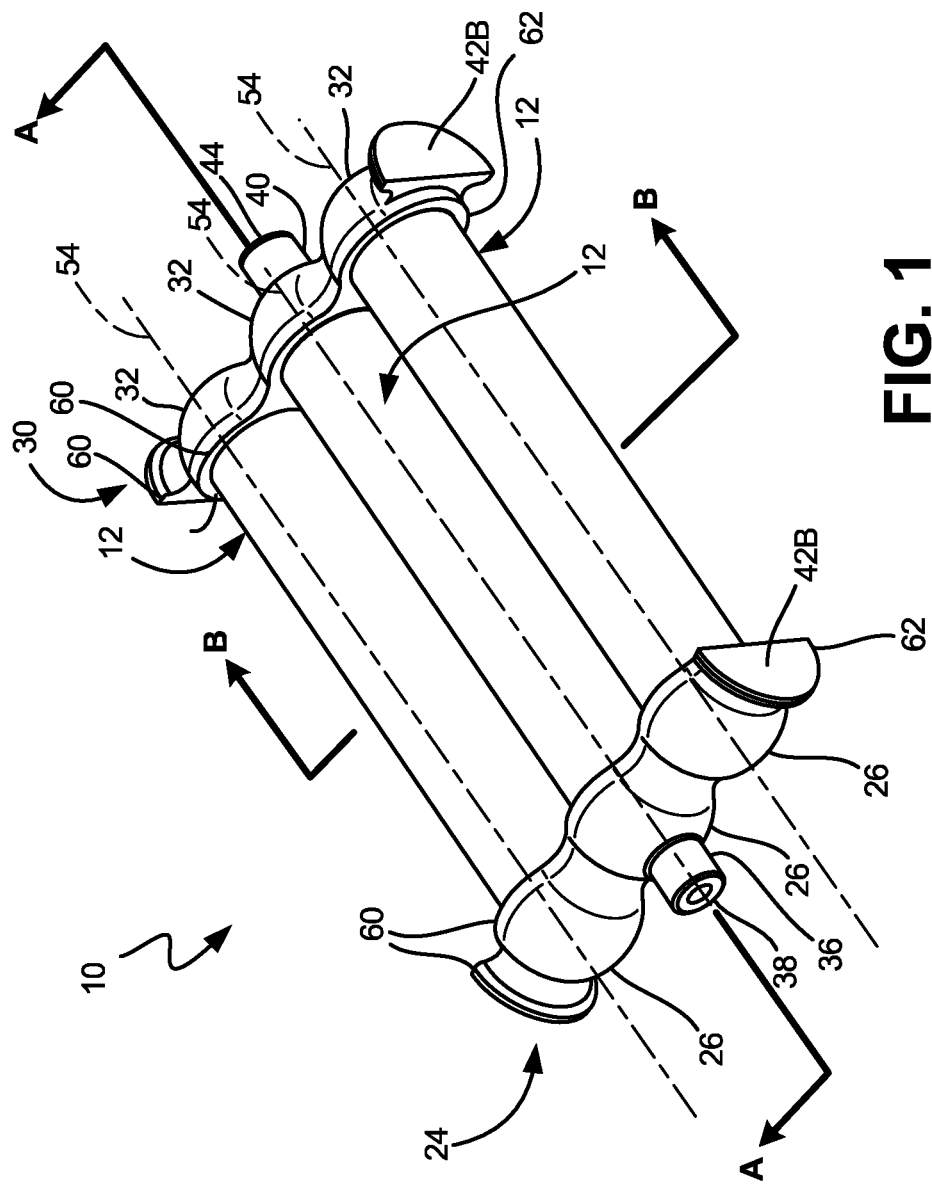
FIG. 1 is a perspective view of an assembly of a plurality of pressure vessel structures having a first cap and a second cap in an assembled state, disclosed in a first exemplary embodiment of the present disclosure.
Figure 2:
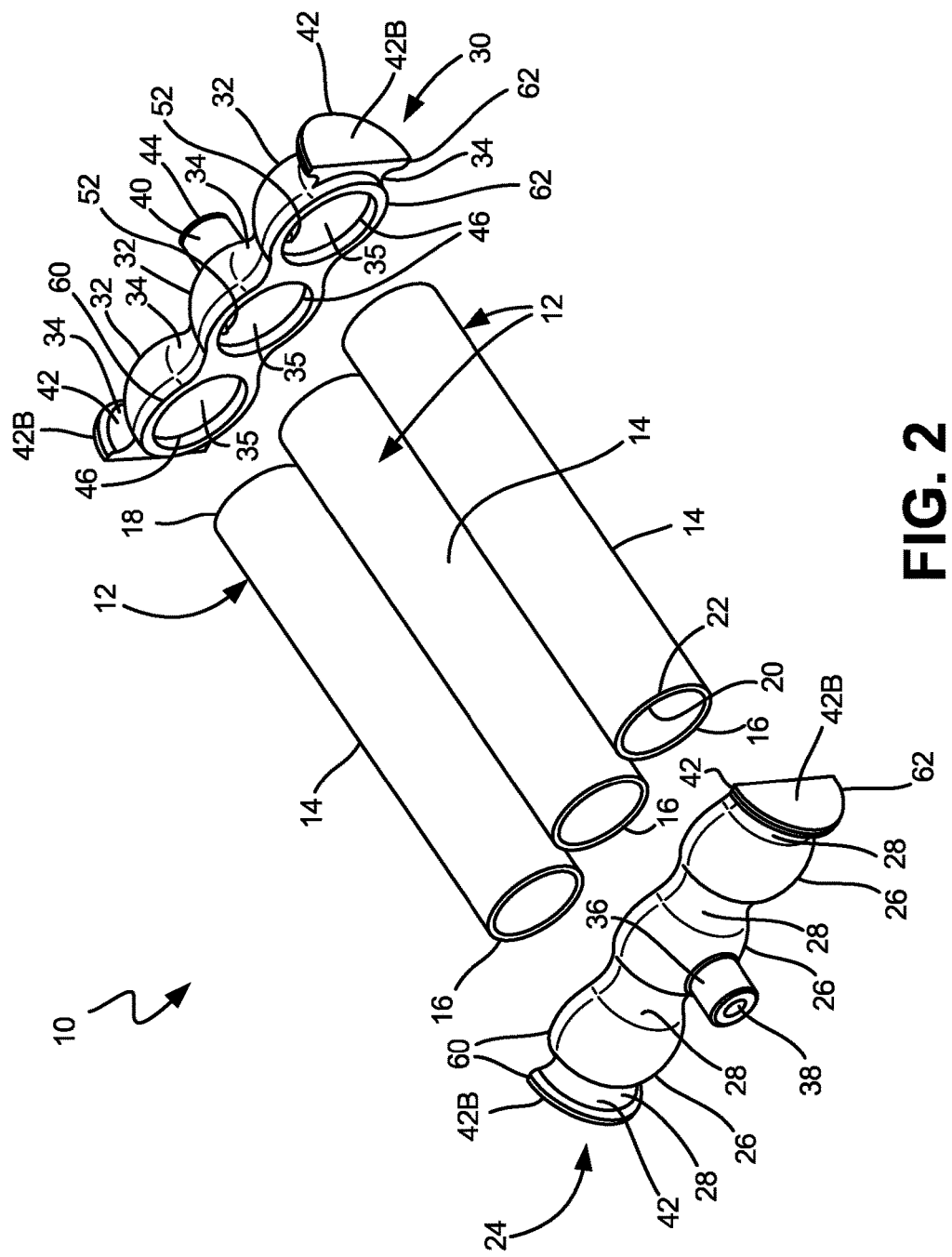
FIG. 2 is a perspective view of the assembly of FIG. 1 in a disassembled state.
Figure 3:
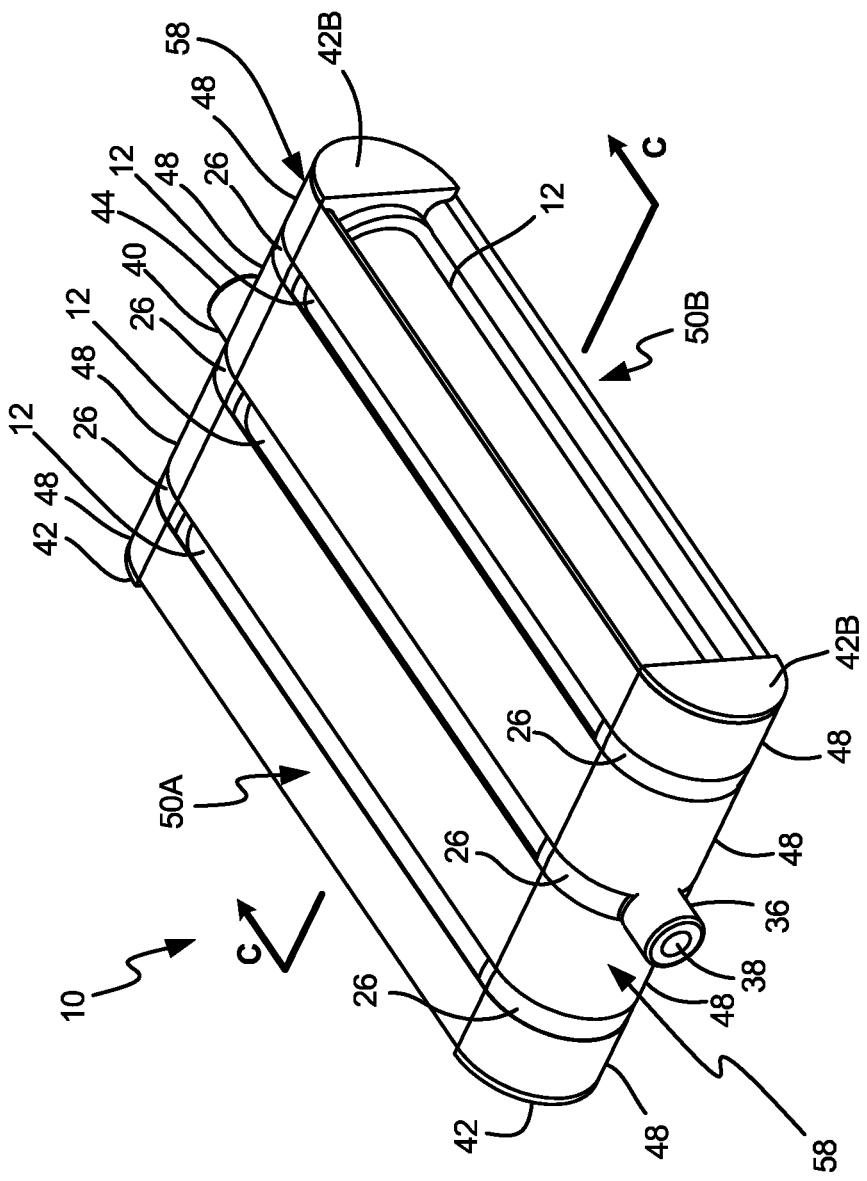
FIG. 3 is a perspective view of the assembly of FIG. 1, further including a plurality of longitudinal fiber reinforcement bands.

In an exemplary embodiment of the present disclosure illustrated in FIGS. 1-3, a first exemplary assembly 10 includes a plurality of pressure vessel structures 12. FIG. 1 illustrates the assembly 10 in an assembled state, FIG. 2 illustrates the assembly 10 in a disassembled state, and FIG. 3 illustrates the assembly 10 in an assembled state showing a plurality of reinforcement structures, such as longitudinal fiber bands 48, which maintain the assemblies 10 in the assembled configuration. Moreover, in an exemplary embodiment, the longitudinal fiber bands 48 also offer structural rigidity to protect the pressure vessels 12 against abrasions, punctures, and other physical damage.

Figure 4:
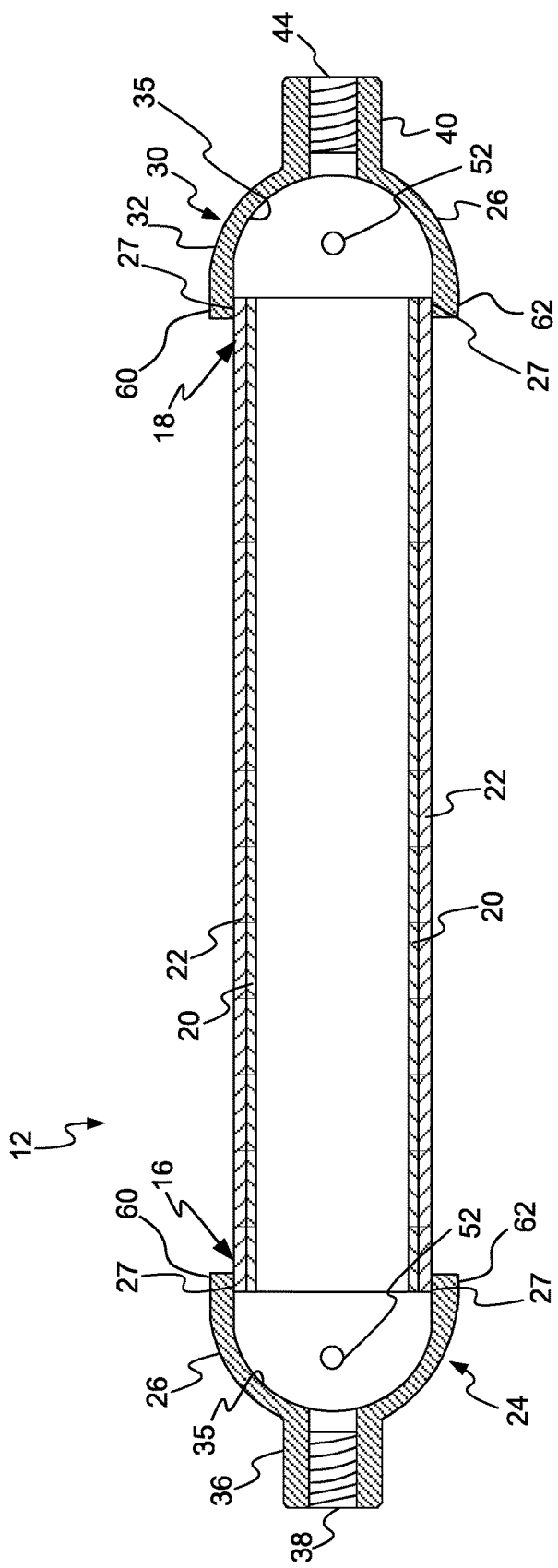
FIG. 4 is a cross-sectional side view of the exemplary pressure vessel assembly, taken along line A-A of FIG. 1.
Figure 5:
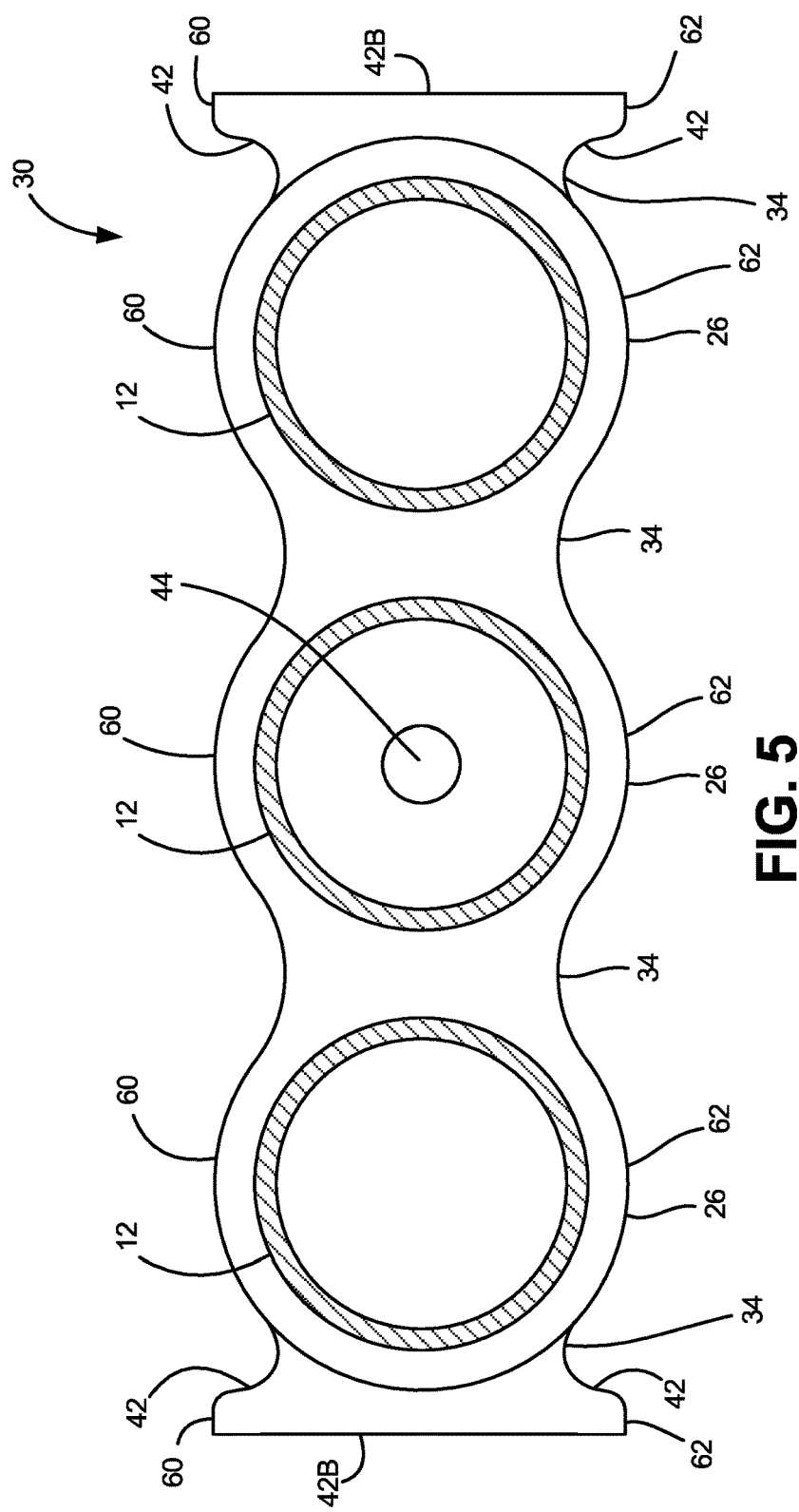
FIG. 5 is a cross-sectional view of the exemplary pressure vessel assembly, taken along line B-B of FIG. 1.

In an exemplary embodiment, each of the plurality of pressure vessel structures 12 of assembly 10 has a main body section 14 terminating in ends 16, 18 (shown in FIG. 2). In an exemplary embodiment, the main body section 14 has a generally cylindrical configuration and a circular cross-section. Each of the pressure vessel structures 12 has a longitudinal axis 54 and is formed with an inner liner 20 covered by an outer composite shell 22 (as shown in FIG. 4). The composite shell 22 resolves structural loads on the pressure vessel structure, while the liner 20 provides a gas barrier. In the illustrative configuration (as shown in FIG. 1) where the assembly 10 is shown having three pressure vessels 12 arranged next to one another, the longitudinal axis 54 of the middle pressure vessel 12 is aligned with ports 38, 44 of caps 24, 30, respectively. However, in another embodiment, ports 38, 44 need not be aligned with any of the pressure vessel structures 12.

Pressure vessels are typically made out of laminated layers of wound fiberglass filaments or other synthetic filaments bonded together by a thermosetting or thermoplastic resin. A polymeric or other non-metal resilient liner or bladder 20 often is disposed within the composite shell 22 to seal the vessel structure 12 and prevent internal fluids from contacting the composite material. (FIG. 4) The composite construction of the vessel structure 12 provides numerous advantages, such as lightness in weight and resistance to corrosion, fatigue and catastrophic failure. These attributes are mainly due to the specific strengths of the reinforcing fibers or filaments that are typically oriented in the direction of the principal forces in the construction of the pressure vessel structure 12 and the resin that binds the filaments together.

In some embodiments, the liner 20 can be made of polymers including elastomers and can be manufactured by compression molding, blow molding, injection molding or any other generally known technique. In other embodiments, the liner 20 can be comprised of other materials, including steel, aluminum, nickel, titanium, platinum, gold, silver, stainless steel, and any alloys thereof. Suitable metals can be generally characterized as having a high modulus of elasticity. In one embodiment, the liner 20 is formed of blow molded high density polyethylene (HDPE).

The shell 22 comprises a generally known composite structure made of fiber reinforcing material in a resin matrix. The fiber may be fiberglass, aramid, carbon, graphite, or any other generally known fibrous reinforcing material. The resin matrix used may be epoxy, polyester, vinyl ester, thermoplastic or any other suitable resinous material capable of providing fiber to fiber bonding, fiber layer to layer bonding, and the fragmentation resistance required for the particular application in which the vessel is to be used.

In one embodiment, first and second caps 24, 30 can be made of a metal such as aluminum or stainless steel. In another exemplary configuration, first and second caps 24, 30 can be made from strong thermosetting plastic materials, such as but not limited to, polyimides and epoxies. Since first and second caps 24, 30 are relatively thick in cross-section compared to the vessel structures 12, the first and second caps 24, 30 are designed so that the pressure in the vessel structures 12 does not exceed the plastic strain limit of the caps 24, 30. In some embodiments, neck portions or bosses 36, 40 in first and second caps 24, 30, respectively, are straight—having a uniform thickness and extending parallel to longitudinal axis 54.

In an exemplary embodiment, first and second caps 24, 30 have similar compositions, structures and dimensions. Accordingly, it is to be understood that in this disclosure, all descriptions pertaining to first cap 24 also apply to second cap 30 and vice versa. Although the exemplary embodiment of assembly 10 illustrated in FIGS. 1 and 2 shows the first cap 24 positioned at the first ends 16 of three pressure vessel structures 12, embodiments of the present disclosure are not limited to three vessel structures per cap, and other suitable configurations with fewer or more than three vessel structures per cap are contemplated. Moreover, in cases where two ports 38, 44 are not required, one of the caps 24, 30 can be closed, with no port 38, 44 therethrough.

In the illustrative embodiment shown in FIGS. 1-3, first cap 24 and second cap 30 are provided at ends 16, 18, respectively, of the plurality of pressure vessel structures 12. Each of the first cap 24 and the second cap 30 are configured to facilitate fluidic communication between the interior of each vessel structure 12 and the exterior surroundings in which the assembly 10 may be placed. The first cap 24 is positioned at the ends 16 of the pressure vessel structures 12. The first cap 24 includes a plurality of dome-shaped protrusions 26 configured to receive each of the first ends 16 of the pressure vessels 12 at an interface 27 (as shown in FIG. 4). The second cap 30 is positioned at the ends 18 of the pressure vessel structures 12. The second cap 30 includes a plurality of dome-shaped protrusions 32 configured to receive each of the second ends 18 of the pressure vessels 12 at an interface 27. Thus, interface 27 is disposed at the intersection of pressure vessel structures 12 and the caps 24, 30.

As shown in FIGS. 2 and 4, in one embodiment, each of the first and second caps 24, 30 includes a plurality of inner recesses 35. Each of the plurality of inner recesses 35 within the first cap 24 is disposed within each of the first dome-shaped protrusions 26, and each of the plurality of inner recesses 35 of second cap 30 is disposed within each of the second dome-shaped protrusions 32. Apertures 52 connect adjacent recesses 35, thereby allowing for fluid communication between the plurality of pressure vessel structures 12 by providing a manifold at each end 16, 18 within the respective caps 24, 30.

Figure 6:
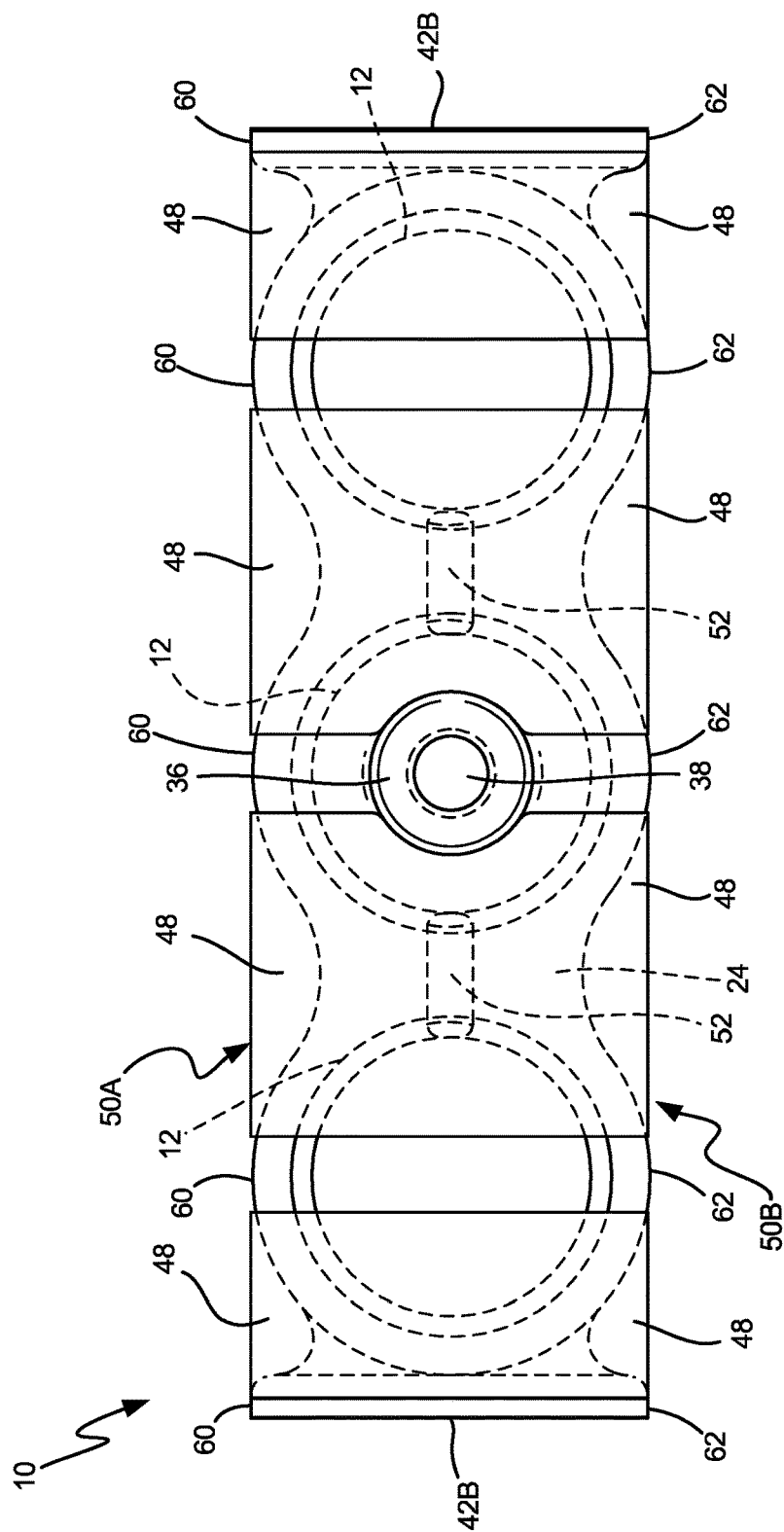
FIG. 6 is an end view from the left side of the exemplary pressure vessel assembly of FIG. 3, with some components shown in phantom.
Figure 7:
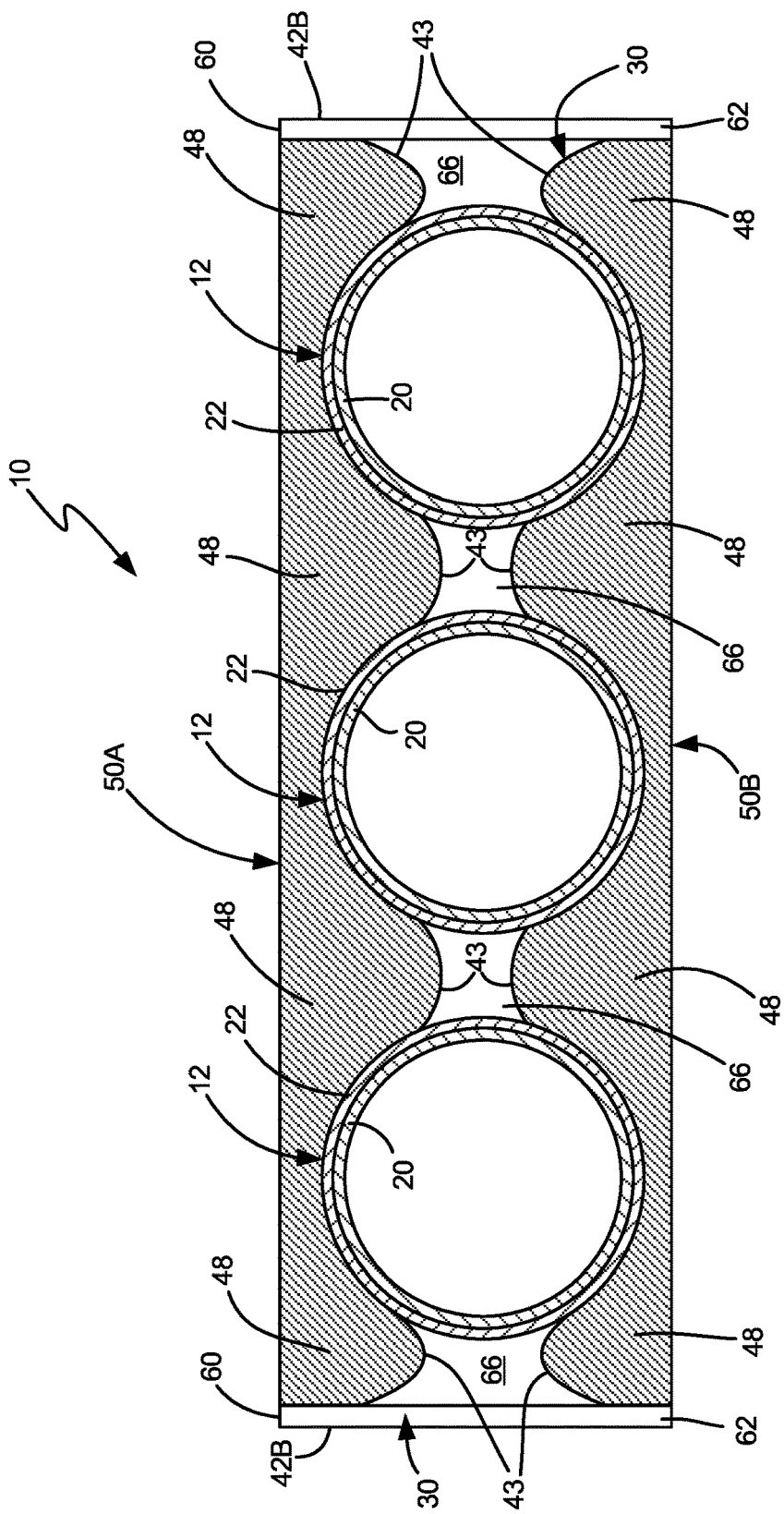
FIG. 7 is a cross-sectional view of the exemplary pressure vessel assembly, taken along line C-C of FIG. 3.

In one embodiment, first cap 24 includes two partial protrusions 42 disposed on the outer sides of the three dome-shaped protrusions 26. The partial protrusions 42 have flat ends 42B. On each side of assembly 10, flat end 42B of first cap 24 is generally co-planar with a flat end 42B of second cap 30. As shown in FIG. 3, the assembly 10 also has a top generally flat surface 50A and a bottom generally flat surface 50B. The flat surfaces 50A, 50B are formed by placing the longitudinal fiber bands 48 in between each of the pressure vessel structures 12 and within opposed fiber band saddles 28, 34 between curve of adjacent protrusions 26, 32 and partial protrusions 42. As shown in FIGS. 6, 7 and 10, with vertically stacked assemblies 10, a generally flat bottom surface 50B of an upper assembly 10 contacts a generally flat top surface 50A of a lower assembly 10. Each assembly 10 also includes curved end surfaces 58, which are oppositely curved. End surfaces 58 include the curved ends of fiber bands 48 and the outer extremes of protrusions 26, 32. Thus, each assembly 10 has a generally rectangular form with a generally flat top surface 50A, generally flat bottom surface 50B, generally flat side surfaces 42B at partial protrusions 42, and curved end surfaces 58. The exemplary configuration allows for any number of assemblies 10 to be arranged in a stacked configuration having a generally rectangular prismatic form for an efficient use of available space. An exemplary configuration showing the shape of the assembly 10 substantially in the form of a rectangular prism for easy stacking is shown in FIGS. 3, 6, 7 and 10.

In the illustrative embodiment shown in FIGS. 1-3, the first cap 24 includes three dome-shaped protrusions 26, four fiber band saddles 28 and two partial protrusions 42. Each of the fiber band saddles 28 is defined between adjacent protrusions 26 or partial protrusions 42. As shown in FIG. 4, the first cap 24 is adapted to engage the plurality of pressure vessel structures 12 at the interface 27, where the three dome-shaped protrusions 26 extend over and seal the three ends 16 of the vessel structures 12. The second cap 30 is positioned at the second ends 18 of the pressure vessel structures 12, and includes a plurality of dome-shaped protrusions 32 corresponding to each of the second ends 18 of the pressure vessels 12. As shown in FIG. 2, a plurality of fiber band saddles 34 are provided, wherein a fiber band saddle 34 is defined between adjacent dome-shaped protrusions 32 and partial protrusions 42. The fiber band saddles 28, 34 are configured to accommodate many layers of fiber windings, which in an exemplary embodiment form longitudinal bands 48, as shown in FIG. 3, and to provide a strongly-held assembly 10 in a compact space. In one embodiment, the longitudinal fiber bands 48 have the same composition as the composite shell 22. While dome-shaped protrusions 26, 32 are illustrated, it is contemplated that other protrusion shapes may also be used.

As shown in FIGS. 2 and 4, in order to facilitate fluidic communication with the interior of each vessel structure 12, the first cap 24 acts as a manifold having a boss 36, through which fluid travels into or out of the interior of the plurality of the pressure vessel structures 12. In an exemplary embodiment, first cap 24 connects all of the pressure vessel structures 12 on a fluid input side. Similarly, the second cap 30 acts as a manifold having a boss 40, through which fluid travels into or out of the interior of the plurality of pressure vessel structures 12. In an exemplary embodiment, second cap 30 connects all of the pressure vessel structures 12 on a fluid output side. In the illustrated embodiment, the first cap 24 includes a boss 36 having a port 38; similarly, the second cap 30 includes a boss 40 having a port 44. Ports 38, 44 allow fluid, such as gases at high pressure, to flow between any external environment (i.e., atmosphere) in which the assembly 10 may be placed and the interior of the plurality of pressure vessel structures 12. Details of an exemplary boss for this purpose are disclosed in U.S. Pat. No. 5,429,845, entitled "Boss for a Filament Wound Pressure Vessel," which is incorporated herein by reference.

As shown in FIG. 2, an interior of second cap 30 is visible. However, the interior of the first cap 24 is not. It is to be understood that in an exemplary embodiment, an interior of first cap 24 is configured similarly to second cap 30. Each of first and second caps 24, 30 includes a plurality of openings 46 that fit over and sealingly engage ends 16, 18 of the respective pressure vessel structures 12. Further, apertures 52 within each cap 24, 30 allow for fluidic communication between the recesses 35 and each of the bosses 36, 40. Thus, each of first and second caps 24, 30 acts as a manifold for the pressure vessel structures 12 on both the input and output ends of the pressure vessel structures 12.

Figure 9A:
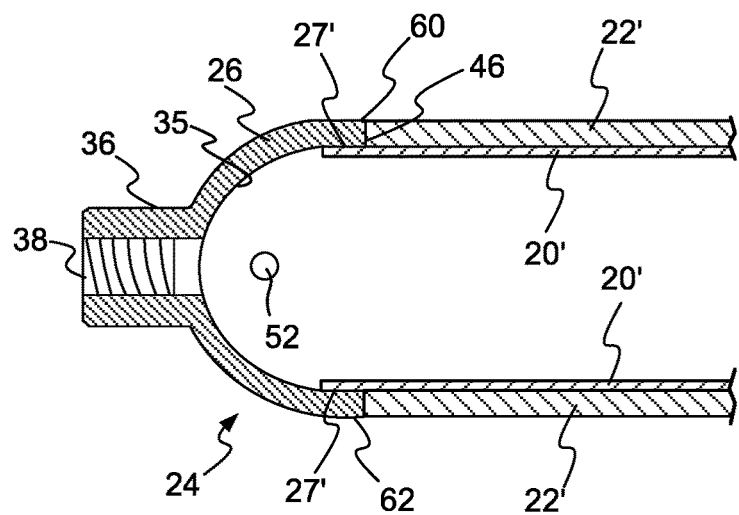
FIG. 9A is similar to FIG. 4 but is a cross-sectional partial side view of a second exemplary embodiment, with a different interface structure at the liner, shell and cap.
Figure 9B:
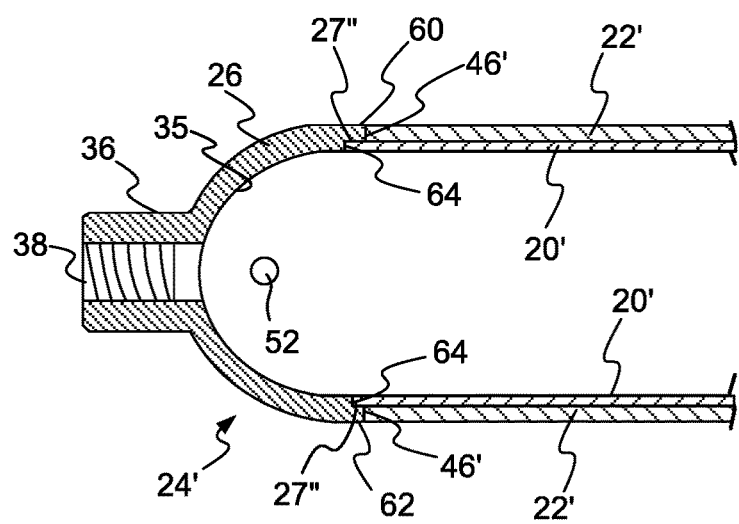
FIG. 9B is similar to FIG. 4 but is a cross-sectional partial side view of a third exemplary embodiment, with yet another interface structure at the liner, shell and cap.

FIG. 9A is similar to FIG. 4 but is a cross-sectional partial side view of a second exemplary embodiment, with a different interface 27' at the liner 20', shell 22' and cap 24. As shown in FIG. 9A, liner 20' fits into opening 46 of cap 24. Shell 22' is hoop-wound onto liner 20' so that its outer surface is flush with top edge 60 and bottom edge 62 of cap 24. FIG. 9B shows yet another interface 27" at liner 20', shell 22' and cap 24'. In this embodiment, cap 24' is provided with an interior groove 64 at opening 46'. Liner 20' fits into groove 64 so that in interior surface of liner 20' is flush with recess 35 of cap 24'. Shell 22' is hoop-wound onto liner 20' so that its outer surface is flush with top edge 60 and bottom edge 62 of cap 24'.

In FIGS. 3, 6-8B and 10, the bands of longitudinal fibers 48 extend around each of the first and second caps 24, 30 such that each band 48 is disposed within a pair of longitudinally aligned first and second saddles 28, 34 (see FIG. 2) of caps 24, 30. The longitudinal fiber bands 48 are also disposed such that the fibers fill in the space between each of the pressure vessels 12 along the length thereof. Doing so allows the longitudinal fiber bands 48 to retain the first and second caps 24, 30 in position on pressure vessels 12 and to prevent their separation in an axial direction along longitudinal axis 54 (see FIG. 1), even despite high internal pressure loads on the assembly 10. The configurations illustrated in FIGS. 6 and 7 depict a substantially rectangular configuration that allows for easy vertical stacking of the assemblies 10.

FIG. 7 is a cross-sectional view of the exemplary pressure vessel assembly 10, taken along line C-C of FIG. 3. It can be seen that where the bands 48 are not separated by the top edges 60 or bottom edges 62 of caps 24, 30, the filaments of the wound fiber bands may blend together, so that the bands are not discrete, separate bands but rather integrate into a cohesive unit. The fibers of bands 48 nest into the spaces between pressure vessel structures 12 to optimize the use of space in assembly 10. In an exemplary embodiment, a gap 66 remains between top and bottom surfaces of internal bulge 43 of each band 48 to allow for expansion of pressure vessel structures 12. It is to be understood that where embodiments of FIG. 9A or 9B are used, the longitudinal bands 48 are more likely to remain substantially separated, as the pressure vessel structures 12 in those cases have outer shells that are flush with top edges 60 and bottom edges 62 of caps 24, 30.

Figure 8A:
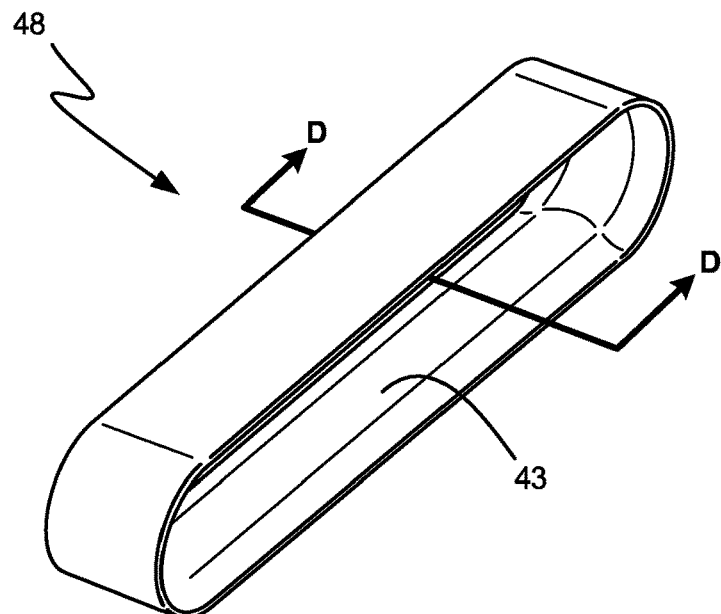
FIG. 8A is a perspective view of a longitudinal fiber reinforcement band of FIG. 3 in isolation.
Figure 8B:
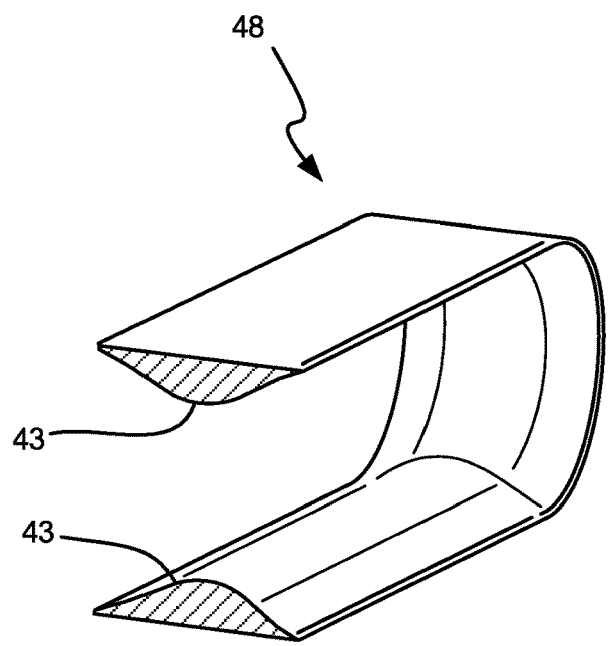
FIG. 8B is a perspective sectional view of the longitudinal fiber reinforcement band of FIG. 8A, taken along line D-D.

A perspective view of one of the longitudinal bands 48 is illustrated in FIGS. 8A and 8B, where it can be seen that the band 48 includes an internal bulge 43 adapted to come in contact with the saddles 28, 34 of caps 24, 30 and fill the space in between the main body sections 14 of each of the plurality of pressure vessels 12.

FIG. 10 shows an arrangement 56 of four such assemblies 10, arranged with two assemblies 10 side-by-side and with a vertical stack of two assemblies 10 high. In the illustrative stacked arrangement 56 of assemblies 10, the partial protrusions 42 are positioned such that the flat ends 42B of each cap 24 are arranged to abut the flat ends 42B of an adjacent cap 24, 30 on each side of each cap 24, 30. A stacked configuration of assemblies 10 can easily be arranged using any number of assemblies 10 to fit into any available space and result in a conformable overall assembly. Efficient use of the available space for holding assemblies 10 is achieved, at least in part because the longitudinal windings of bands 48 are positioned in the void spaces between, and along the lengths of, the cylindrical vessels structures 12.

As shown in FIGS. 3 and 6, some portions of pressure vessels 12, first cap 24 and second cap 30 are not covered by longitudinal fiber bands 48 (such as at top edges 60 or bottom edges 62 of caps 24, 30). However, in a case where additional fiber reinforcement is desired, it is to be understood that composite or other fibers may be additionally wound over the entire assembly 10, as long as ports 38, 44 of bosses 36, 40 remain accessible. Such additional fiber winding provides for structural rigidity and reinforces the strength of the assembly 10, such that the pressure vessels 12 and caps 24, 30 are less likely to separate.

In an exemplary method of construction of assembly 10, liner 20 is made of a polymer or corrosion-free metal by compression molding, blow molding, injection molding or any other generally known technique. Then, composite shell 22 is formed over liner 20. An exemplary composite shell 22 is fabricated by continuous winding of filament, wire, yarn, tape or other fibrous structures, that are either previously impregnated with a resin matrix material, impregnated during winding, or impregnated post winding, are placed over the liner, which is typically supported on a rotating form or a cylindrically-shaped mandrel. The fiber is applied over the liner 20 in a predetermined pattern to meet specific stress conditions. The tension of the fibers over the mandrel provides positive pressure to compact the laminate. The mandrel defines the shape of the assembly 10.

After the desired number of layers is applied, the wound form is cured, sometimes at elevated temperatures. In one embodiment, a constant electrical current is supplied through the pre-impregnated filament as the filament is being wound on the mandrel. The filament-winding machine traverses the mandrel at speeds that are synchronized with the rotations of the mandrel and controls the winding angle of the reinforcement fibers and the fiber lay-down rate. Mandrel removal, trimming and other finishing operations can be used to complete the process of fabricating a pressure vessel structure 12. Details relevant to the formation of exemplary pressure vessel structures 12 are disclosed in U.S. Pat. No. 4,838,971, entitled "Filament Winding Process and Apparatus," which is incorporated herein by reference.

Thus, in a method of constructing assembly 10, each pressure vessel structure 12 is formed by disposing a fiber-reinforced shell 22 over a liner 20. Once the liner material solidifies, the shell is wound over the liner. The composite construction of the vessels 12 provides numerous advantages, such as lightness in weight and resistance to fragmentation, corrosion, fatigue and catastrophic failure. These attributes are due to the high specific strengths of the reinforcing fibers or filaments that are typically oriented in the direction of the principal forces in the construction of the pressure vessel structures 12.

After at least the liners 20 of the pressure vessel structures 12 are formed, first and second caps 24, 30 are placed at first and second ends 16, 18, respectively, of body section 14 of the plurality of pressure vessel structures 12. First and second caps 24, 30 provide ports 38, 44 in bosses 36, 40 respectively, for communicating with the interior of each vessel structure 12. First ends 16 are inserted into openings 46 (visible on second cap 30 in FIG. 2) of first cap 24, wherein interface 27 is defined where pressure vessel structures 12 contact first cap 24, as shown in FIG. 4. In an exemplary embodiment, the first cap 24 and pressure vessel structures 12 are sealed to each other at interface 27 by means including but not limited to the use of adhesives, welding, and mechanical fasteners. Similarly, second ends 18 are inserted into openings 46 of second cap 30. In an exemplary embodiment, the second cap 30 and pressure vessel structures 12 are sealed to each other at interface 27 by means including but not limited to the use of adhesives, welding, and mechanical fasteners. In one embodiment, the interface 27 between the caps 24, 30 and the ends 16, 18 is precision-machined so as to ensure leak-free operation.

Although the present disclosure has been described with reference to preferred embodiments, workers skilled in the art will recognize that changes may be made in form and detail without departing from the scope of the disclosure. In addition, any feature disclosed with respect to one embodiment may be incorporated in another embodiment, and vice-versa.

The invention claimed is:
1. An apparatus comprising:
a plurality of substantially cylindrical pressure vessel structures, each structure having first and second opposite ends;
a first cap positioned at the first ends of the plurality of cylindrical pressure vessel structures, wherein the first cap comprises a first dome-shaped protrusion corresponding to each of the first ends, wherein a first saddle is defined between adjacent first dome-shaped protrusions;
a second cap positioned at the second ends of the plurality of cylindrical pressure vessel structures, wherein the second cap comprises a second dome-shaped protrusion corresponding to each of the second ends, wherein a second saddle is defined between adjacent second dome-shaped protrusions; and
a filament-wound fiber band extending around the first and second caps and disposed in contact with one of the first saddles and one of the second saddles, wherein the band is disposed between adjacent pressure vessel structures along a length of the adjacent pressure vessel structures and comprises an internal bulge configured to fill a space between the adjacent pressure vessel structures, and wherein the band secures the first cap and the second cap to the plurality of cylindrical pressure vessel structures.

2. The apparatus of claim 1, wherein the first cap comprises a port configured to allow fluid communication between an atmosphere outside the apparatus and an interior of each of the plurality of pressure vessel structures.

3. The apparatus of claim 1, wherein the first cap comprises a first inner recess corresponding to each first dome-shaped protrusions, and wherein the first cap further comprises an aperture connecting two adjacent first inner recesses.

4. The apparatus of claim 1, wherein the first cap further comprises two partial protrusions disposed on outer sides of the plurality of first dome-shaped protrusions, the two partial protrusions having flat end surfaces.

5. The apparatus of claim 1, wherein each of the plurality of cylindrical pressure vessel structures comprises a liner.

6. The apparatus of claim 5, further comprising a composite shell layer disposed over the liner.

7. The apparatus of claim 6 wherein the composite shell layer is a hoop-wound layer.

8. The apparatus of claim 1, wherein the filament-wound fiber band is oriented generally parallel to a longitudinal axis of each of the plurality of pressure vessel structures.

9. The apparatus of claim 1, wherein each of the plurality of pressure vessel structures comprises a main body section terminating in two open ends.

10. The apparatus of claim 1, wherein each of the plurality of pressure vessel structures comprises a closed, substantially hemispherical end.

11. A method of constructing an assembly, comprising:
forming a plurality of generally cylindrical pressure vessel structures, each having a first end and a second end;
inserting the first end of the plurality of pressure vessel structures into a first cap;
inserting the second end of the plurality of pressure vessel structures into a second cap; and;
filament-winding a fiber band around the first and second caps and between adjacent pressures vessel structures along a length of the adjacent pressure vessels to fill a space between the adjacent pressure vessels, to secure the first cap and the second cap to the plurality of generally cylindrical pressure vessel structures.

12. The method of claim 11, further comprising sealing the first cap and each of the first ends of the pressure vessel structures to each other at respective interfaces.

13. The method of claim 11, wherein forming each of the plurality of pressure vessel structures comprises forming an inner polymer liner and disposing a fiber-reinforced shell over the inner polymer liner.

14. The method of claim 13, wherein disposing the fiber-reinforced shell over the inner polymer liner comprises filament hoop-winding the fiber-reinforced shell over the liner.

15. The method of claim 11, further comprising forming a plurality of saddles in the first cap and in the second cap, wherein each of the plurality of saddles is defined between adjacent dome-shaped protrusions.

16. The method of claim 15, further comprising placing the fiber band in contact with one of the plurality of saddles of the first cap and in contact with one of the plurality of saddles of the second cap.

17. An arrangement comprising:
a plurality of pressure vessel assemblies stacked side-by-side and vertically, each assembly comprising:
a first cap positioned at first ends of the plurality of cylindrical pressure vessel structures, wherein the first cap comprises a first flat end positioned on each side of the first cap;
a second cap positioned at second ends of the plurality of cylindrical pressure vessel structures, wherein the second cap comprises a second flat end positioned on each side of the second cap;
a filament-wound fiber band extending around the first and second caps and between two adjacent pressure vessel structures of the plurality of cylindrical pressure vessel structures, wherein the band is disposed between adjacent pressures vessel structures along a length of the adjacent pressure vessels and comprises an internal bulge configured to fill a space between the adjacent pressure vessels, and wherein the band secures the first cap and the second cap to the plurality of cylindrical pressure vessel structures;
a generally flat top surface; and
a generally flat bottom surface;
wherein the bottom surface of a first assembly is stacked vertically upon a top surface of a second assembly; and
wherein the second assembly is arranged side-by-side relative to a third assembly, wherein the first flat end of the first cap of the second assembly abuts the first flat end of the first cap of the third assembly, and wherein a second flat end of the second cap of the second assembly abuts the second flat end of the second cap of the third assembly.

\* \* \* \* \*